(12) United States Patent
Rykowski

(10) Patent No.: US 9,843,572 B2
(45) Date of Patent: Dec. 12, 2017

(54) DISTRIBUTING AN AUTHENTICATION KEY TO AN APPLICATION INSTALLATION

(71) Applicant: AirWatch LLC, Atlanta, GA (US)

(72) Inventor: Adam Stephen Rykowski, Decatur, GA (US)

(73) Assignee: AirWatch LLC, Atlanta, GA (US)

( * ) Notice: Subject to any disclaimer, the term of this patent is extended or adjusted under 35 U.S.C. 154(b) by 150 days.

(21) Appl. No.: 14/753,889

(22) Filed: Jun. 29, 2015

(65) Prior Publication Data

US 2016/0381006 A1    Dec. 29, 2016

(51) Int. Cl.
H04L 29/06    (2006.01)
H04L 9/32     (2006.01)

(52) U.S. Cl.
CPC ........ H04L 63/0823 (2013.01); H04L 9/3242 (2013.01); H04L 9/3268 (2013.01); H04L 63/06 (2013.01)

(58) Field of Classification Search
CPC . H04L 63/0823; H04L 9/3242; H04L 9/3268; H04L 63/06
See application file for complete search history.

(56) References Cited

U.S. PATENT DOCUMENTS

| | | | |
|---|---|---|---|
| 7,257,583 B2 * | 8/2007 | Hofmeister | G06F 8/61 |
| 7,496,755 B2 * | 2/2009 | Genty | G06F 21/41 |
| | | | 713/170 |
| 7,536,722 B1 * | 5/2009 | Saltz | G06F 21/33 |
| | | | 726/20 |
| 8,090,797 B2 * | 1/2012 | Chinta | G06F 21/53 |
| | | | 709/203 |
| 8,515,066 B2 | 8/2013 | Saito et al. | |
| 8,752,145 B1 | 6/2014 | Dotan | |
| 8,763,089 B2 | 6/2014 | Qureshi | |
| 9,152,781 B2 * | 10/2015 | Sowatskey | G06F 21/335 |
| 9,230,085 B1 | 1/2016 | Paczkowski | |
| 9,232,341 B2 | 1/2016 | Fisher | |
| 2004/0088576 A1 | 5/2004 | Foster et al. | |
| 2007/0186106 A1 * | 8/2007 | Ting | H04L 63/104 |
| | | | 713/168 |
| 2007/0220271 A1 | 9/2007 | Law | |
| 2008/0072060 A1 | 3/2008 | Cannon | |
| 2008/0301784 A1 * | 12/2008 | Zhu | H04L 63/0823 |
| | | | 726/5 |
| 2011/0035768 A1 | 2/2011 | Ling et al. | |

(Continued)

OTHER PUBLICATIONS

International Search Report dated Oct. 4, 2016 for PCT/US2016/039633.

(Continued)

*Primary Examiner* — Sharon Lynch
(74) *Attorney, Agent, or Firm* — Thomas | Horstemeyer, LLP

(57) ABSTRACT

Disclosed are various examples for facilitating distribution of an authentication code to installation of managed applications. An identity certificate is sent to a device by installing a configuration profile on the client device. The configuration profile includes the identity certificate. A management service can also initiate installation of a managed application. The identity certificate can be used to authenticate the client device so that an authentication key can be provided to the managed application.

20 Claims, 5 Drawing Sheets

(56) References Cited

U.S. PATENT DOCUMENTS

| | | | |
|---|---|---|---|
| 2011/0119747 A1* | 5/2011 | Lambiase | G06F 21/335 726/8 |
| 2011/0126002 A1* | 5/2011 | Fu | H04L 63/0823 713/156 |
| 2011/0173681 A1 | 7/2011 | Qureshi | |
| 2012/0047425 A1* | 2/2012 | Ahmed | G06F 17/30905 715/234 |
| 2012/0079609 A1* | 3/2012 | Bender | G06F 21/629 726/30 |
| 2012/0102566 A1* | 4/2012 | Vrancken | G06F 21/335 726/20 |
| 2012/0117057 A1* | 5/2012 | Adimatyam | H04N 21/4147 707/723 |
| 2012/0233537 A1* | 9/2012 | Kawabata | H04N 1/00408 715/234 |
| 2012/0254857 A1* | 10/2012 | Doraiswamy | G06F 8/61 717/177 |
| 2012/0304310 A1* | 11/2012 | Blaisdell | G06F 21/52 726/28 |
| 2013/0078953 A1 | 3/2013 | Miller | |
| 2013/0262858 A1* | 10/2013 | Neuman | H04L 63/08 713/155 |
| 2013/0346753 A1 | 12/2013 | Boysen | |
| 2014/0007215 A1* | 1/2014 | Romano | H04L 63/0281 726/12 |
| 2014/0007222 A1* | 1/2014 | Qureshi | G06F 21/10 726/16 |
| 2014/0181946 A1* | 6/2014 | Lambiase | G06F 21/335 726/8 |
| 2014/0281506 A1 | 9/2014 | Redberg | |
| 2014/0282610 A1 | 9/2014 | Strom et al. | |
| 2015/0294515 A1 | 10/2015 | Bergdale | |
| 2015/0350179 A1* | 12/2015 | Kobayashi | H04L 63/08 726/4 |
| 2016/0094546 A1* | 3/2016 | Innes | H04L 63/0823 713/156 |
| 2016/0119354 A1* | 4/2016 | Logue | H04L 63/0884 713/168 |
| 2016/0156598 A1 | 6/2016 | Alonso Cebrian | |
| 2016/0191249 A1 | 6/2016 | Panchapakesan et al. | |
| 2017/0041151 A1* | 2/2017 | Kommireddy | H04L 9/006 |

OTHER PUBLICATIONS

Office Action dated Jan. 26, 2017 for U.S. Appl. No. 14/876,827.
Notice of Allowance dated Jul. 14, 2017 for U.S Appl. No. 14/876,827.

* cited by examiner

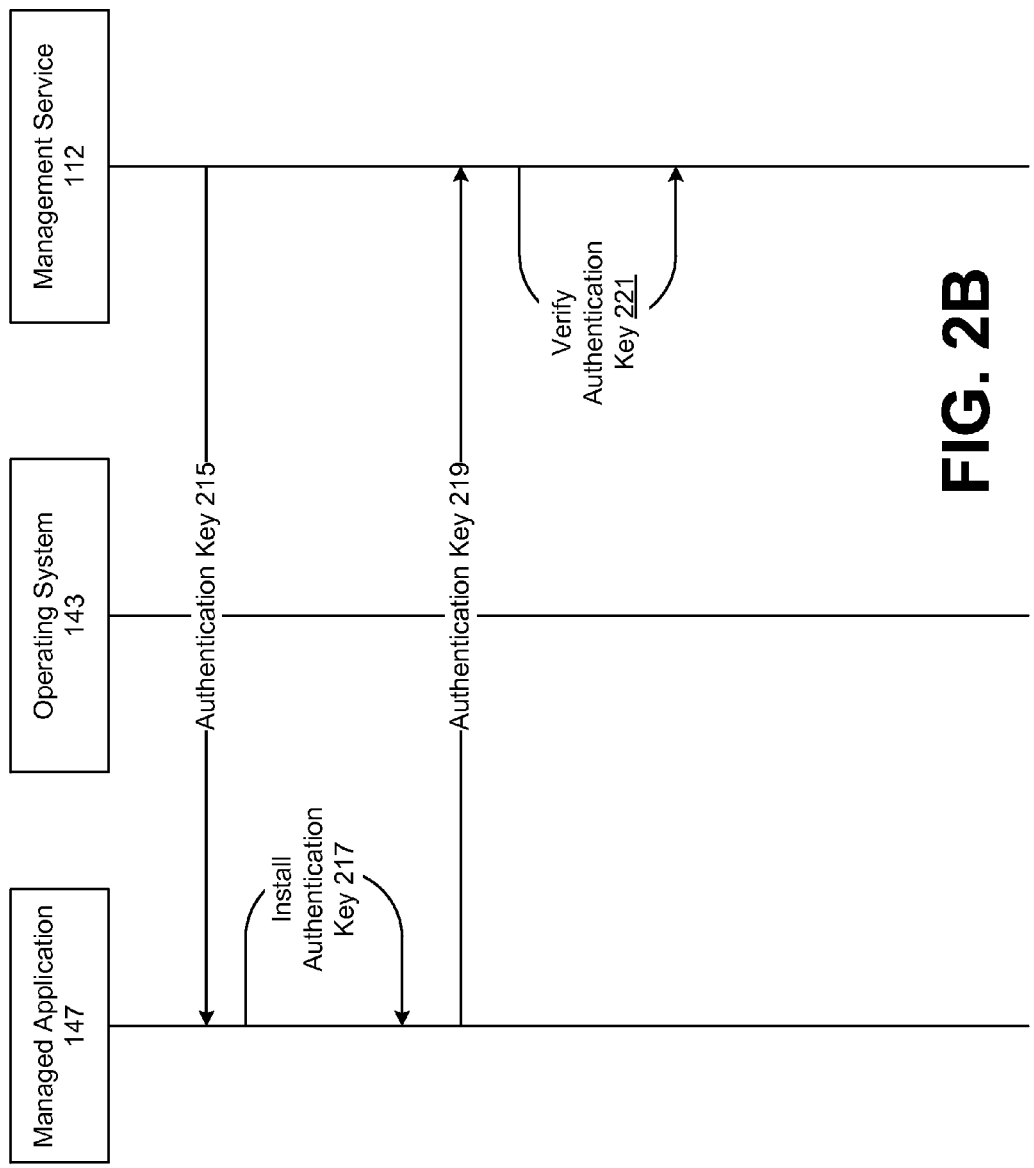

DISTRIBUTING AN AUTHENTICATION KEY TO AN APPLICATION INSTALLATION

BACKGROUND

Authentication of users is important to maintain data security and access control. Applications are often installed on a client device as a managed application. Managed applications can be installed at the request of an enterprise mobility management (EMM) system. An EMM system can initiate installation of an application on a client device once the client device is enrolled with the EMM system as a managed device. Enrolling the client device as a managed device grants the EMM infrastructure certain privileges to manage, monitor, or otherwise oversee the operation of the managed device. In an enterprise environment, such as a corporate environment in which devices are issued to employees of a company, an administrator can initiate installation of various applications on a client device that provide various functionality to users that are associated with the enterprise.

For example, the EMM infrastructure can initiate installation of an application on a client device by instructing the client device to download and install the application from an application repository, such as a public application marketplace from which software can be downloaded or purchased. In some instances, an enterprise may have a number of applications that administrators can make available to the users within the enterprise. One or more of these applications can require a user to authenticate his or her identity in order to use the application or access resources locally or over a network using the application. To facilitate user authentication, an EMM infrastructure can distribute an authentication key to a managed application that the managed application can use to authenticate the identity of a user account associated with a particular client device. Accordingly, secure distribution of an authentication key can be desirable to facilitate authentication of the installations of managed applications.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

FIGS. 2A-2B depict example sequence diagrams.

DETAILED DESCRIPTION

Figure 1:
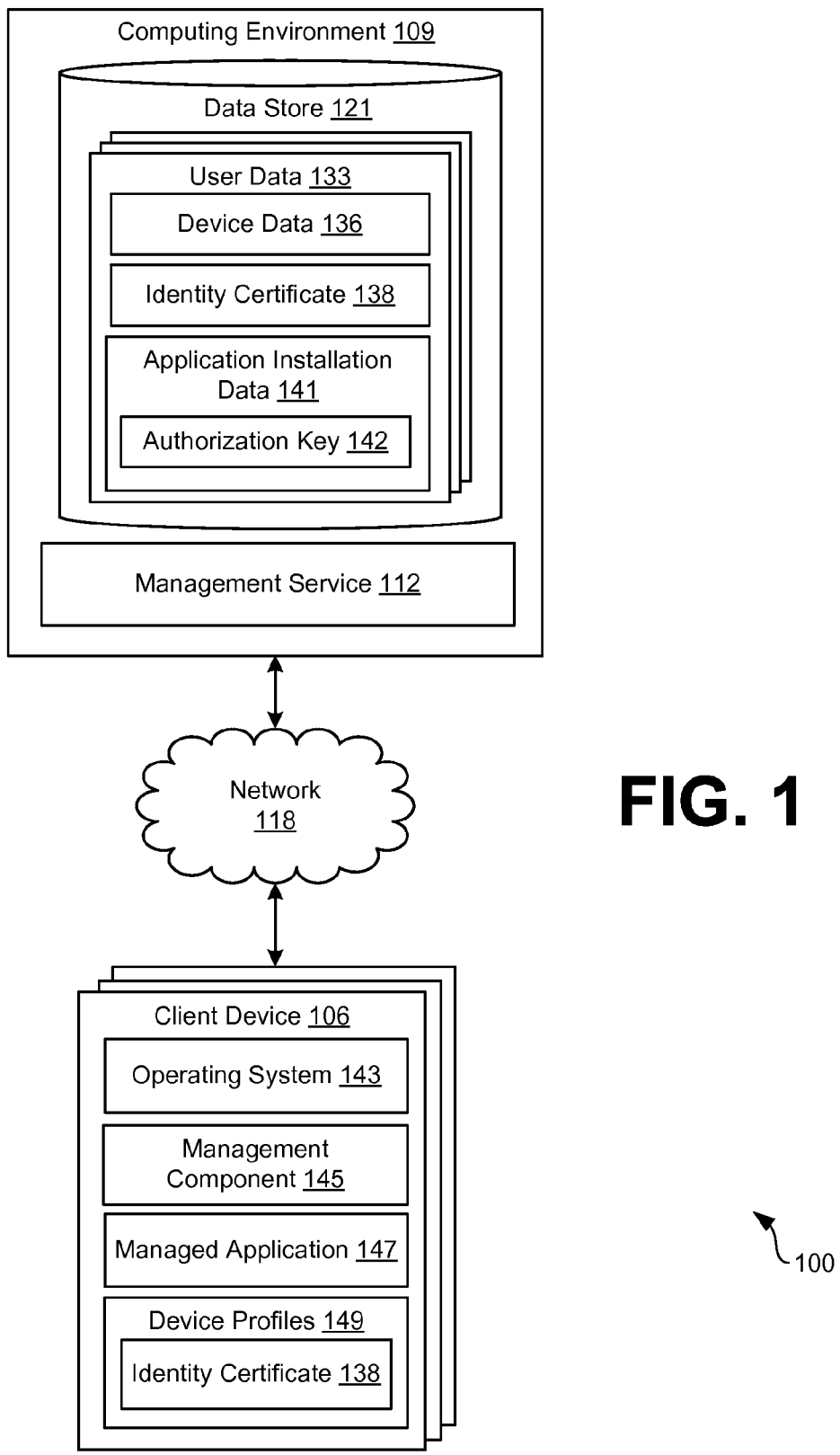
FIG. 1 is a drawing of an example networked environment.

Authentication of users can be important to maintain data security and access control to local and network resources. As noted above, applications are often installed on a client device as a managed application. Managed applications can be installed at the request of a management service that implements enterprise mobility management (EMM) functionality. The management service can initiate installation of an application on a client device once the client device is enrolled with the management service as a managed device. In order to complete enrollment of a device, a user can present his or her user credentials to the management service using a software agent or component running on the client device. The software agent or component running on the client device can authenticate the user with the management service. The management service can leverage application programming interfaces (API's) that are provided by an operating system executed by the client device in order to manage, monitor, or otherwise oversee the operation of the managed device. In an enterprise environment, such as a corporate environment in which devices are issued to employees of a company, an administrator can initiate installation of applications on a client device. Applications that are installed at the direction of the management service can be managed applications.

In some scenarios, a user's credentials for a user account can be used to authenticate the user to the management service or other systems accessible over a network by an application installed as a managed application. The user's identity can be verified by providing an authentication key, or a session token, to the installed instance of an application that can be used for subsequent communications. For example, the authentication key can include a session token, an access token, or other type of token that allows a user account to be verified without requiring the user's actual credentials, such as a username/password pair. The installation of the application can then provide this authentication key to the management service or any other service provider system that requires verification of a user account in order to provide access to a resource for the application.

Examples of the present disclosure can facilitate secure distribution of authentication tokens to application installations on client devices that are enrolled with a management service as managed devices. Authentication tokens can be provided to a client device only after the client device is authenticated by way of an identity certificate that is installed on the client device by the management service. Because a managed device can grant certain privileges to the management service, the management service can have the authority to install various types of configuration profiles on a managed device. The installation of configuration profiles can be facilitated by management API's that are provided by the operating system executed by the client device. For example, the APPLE IOS operating system can provide management API's that can be used to install a configuration profile that includes, as a payload, an identity certificate.

The management API's can be made available to the management service for devices that are enrolled as managed devices. In one scenario, an identity certificate can be installed on a client device by incorporating the certificate with a configuration profile that is installed on a client device by the management service. The management service can then utilize functionality of the operating system of the client device that leverages this certificate in order to verify the identity of the client device. The management service verifies the identity of the client device to determine whether an authentication key should be provided to the client device in response to subsequent network communications from an installation of an application that has not yet authenticated itself with the management service.

With reference to FIG. 1, shown is a networked environment 100 according to various examples. The networked environment 100 includes a client device 106 and a computing environment 109, which can be in data communication with one another over the network 118. The network 118 includes, for example, the Internet, one or more intranets, extranets, wide area networks (WANs), local area networks (LANs), wired networks, wireless networks, other suitable networks, or any combination of two or more such networks.

For example, the networks can include satellite networks, cable networks, Ethernet networks, and other types of networks.

The computing environment 109 can include, for example, a server computer. Alternatively, the computing environment 109 can employ multiple computing devices that can be arranged, for example, in one or more server banks or computing clusters. The computing devices can be located in a single installation or can be distributed among many different geographical locations. For example, the computing environment 109 can include multiple computing devices that together form a hosted computing resource, a grid computing resource, or any other distributed computing arrangement. In some cases, the computing environment 109 can operate as at least a portion of an elastic computing resource where the allotted capacity of processing, network, storage, or other computing-related resources can vary over time. The computing environment 109 can also include or be operated as one or more virtualized computer instances. Generally, the computing environment 109 can be operated in accordance with particular security protocols such that they are considered trusted computing environments. The data stored in the data store 121 is associated with the operation of the various components described below.

The computing environment 109 can execute a management service 112 or other systems. The management service 112 can manage or oversee the operation of multiple client devices 106. In some examples, an enterprise, such as one or more companies or other organizations, can operate the management service 112 to oversee or manage the operation of the client devices 106 of employees, contractors, or other users within an enterprise environment. In this sense, the client devices 106 are managed devices that are managed by the management service 112.

The client device 106 can be enrolled as a managed device with the management service 112 through APIs provided by the operating system executed by the client device 106. The enrollment process can include authentication of a user's credentials. Upon authentication of a user's credentials by the management service 112, the management service 112 can transmit a management profile to the client device 106. The management profile allows use of the management APIs provided by the operating system to perform various management functions.

Examples of management functions can include commands to erase certain data from the client device 106, install certain applications or application updates, install configuration profiles, lock a client device 106 or activate a display lock feature, perform a factory reset of the client device 106, or perform other management functions. As noted above, an identity certificate that is generated by the management service 112 or obtained from another service, such as a certificate authority, can be installed by the management service 112 on a client device 106 by distributing a configuration profile to the client device 106. An identity certificate can be uniquely associated with a user account and used to identify the identity of a client device 106 or a user account associated with the client device 106. For example, an identity certificate can authenticate a user's access to email, a network, or other resources. In examples of this disclosure, the certificate can facilitate authentication of a user account associated with the client device 106. Upon installation of a certificate, an authentication key can also be deployed to an installation of an application that is installed as a managed application on the client device 106.

An identity certificate can also be manually installed on a client device 106 by a user or administrator. In this scenario, a certificate can be sent to a client device 106 as an attachment to an email or can be downloaded to the client device 106 from a network source or local storage. A user or administrator can then download and install the certificate on the client device 106. In another scenario, a certificate can also be distributed to a client device 106 using a protocol such as Simple Certificate Enrollment Protocol (SCEP). In this scenario, the management service 112 or another service can distribute a certificate to the client device 106 using a protocol implemented by API's provided by the operating system executed by the client device 106. The identity certificate, or a profile with which the identity certificate is installed, can also specify which applications installed on the client device 106 have permission to access the identity certificate. An example of a profile with which an identity certificate can be installed is a "single sign-on profile."

The management service 112 can also facilitate ensuring that client devices 106 that are managed by the management service 112 are operating in compliance with various compliance rules. In one scenario, the management service 112 can issue management commands that instruct a client device 106 to take a particular action with respect to a compliance rule. For example, if a client device 106 is designated as lost or stolen, the management service 112 can issue a command instructing the client device 106 to erase data and applications stored on the client device 106. If the management service 112 determines that a client device 106 has violated a compliance rule with respect to having unauthorized modifications or unauthorized applications installed on the client device 106, the management service 112 can issue a command instructing the client device 106 to erase data and applications that stored on the client device 106. As another example, the management service 112 can also issue a command instructing the client device 106 to activate a display lock of the client device 106 that requires a user to enter a PIN in order to use the client device 106. The client device 106 can also store compliance rules locally and enforce compliance rules using a process that is installed on the client device 106.

The data stored in the data store 121 includes, for example, user data 133. The data store 121 can also store compliance rules, user email, calendar data, contact data, documents, files, and other enterprise data that is not depicted and is not necessary for a full understanding of examples of the disclosure. User data 133 can include information with which a user account can be authenticated, such as user credentials, a username/password pair, or an encrypted form of any type of authentication credentials. User data 133 can also include data such as applications, email, contact, calendar data, documents, files or other data that is associated with a user account or a client device 106 of a user.

Device data 136 can represent data stored in the data store 121 that is associated with client devices 106 that are enrolled with the management service 112 as managed devices. Device data 136 can include a unique device identifier associated with the client device 106, device policies that are associated with a particular client device 106, information about configuration profiles associated with a client device 106, status information associated with a particular client device 106, and other data that facilitates management of the client device 106 by the management service 112. When a particular client device 106 is enrolled with the management service 112 as a managed device, the management sever 112 can create an entry in the device data 136 so that the client device 106 can be associated with a user account of a particular user.

An identity certificate 138 can represent a public key certificate that includes information about a particular user and a key associated with the user. The identity certificate 138 can also include a digital signature of a certificate authority that is the signer of the certificate. In some scenarios, the identity certificate 138 can be self-signed by the management service 112, which can generate the identity certificate 138 on behalf of a user that is used for various identity verification purposes, as is described above.

Application installation data 141 represents data associated with applications that are installed as managed applications on one or more client devices 106 that are associated with a user account. Application installation data 141 can include an identity of applications that are installed on a particular user's client device 106, license data for a particular installation of an application, application settings, configurations, a copy of the application, version information, or any other data associated with applications that are installed on a user's client device 106. Application installation data 141 can also include an authentication key 142 that is associated with a particular installation of an application on a client device 106. In this disclosure, a particular installation of an application on a client device 106 is also referred to as an application installation.

An authentication key 142 can include a session token, an access token, or other type of token that allows a user account to be verified without requiring the user's actual credentials, such as a username/password pair. The authentication key 142 can also include a keyed-hash message authentication code (HMAC) generated by the management service 112 and associated with an application installation. The authentication key 142 is a unique code or token that is associated with a particular installation of an application on a particular client device 106, where the application is installed as a managed application at the direction of the management service 112. The authentication key 142 can be provided to an application installation upon authentication of a user's identity and can be used by the application installation to authenticate itself to the management service 112.

The client device 106 is representative of one or more devices that can be associated with a user or enterprise that can be enrolled with the management service 112 as a managed device. The client device 106 can represent a processor-based system, such as a computer system, that may be embodied in the form of a desktop computer, a laptop computer, a personal digital assistant, a cellular telephone, a smartphone, a set-top box, a music player, a web pad, a tablet computer system, a game console, an electronic book reader, or any other device with like capability. The client device 106 can include a display that comprises, for example, one or more devices such as liquid crystal display (LCD) displays or other types of display devices. The client device 106 can also be equipped with networking capability or networking interfaces, including a localized networking or communication capability such as an NFC capability, RFID read and/or write capability, a microphone and/or speaker, or other localized communication capability.

The client device 106 can be configured to execute an operating system 143 that provides various APIs that facilitate management of the device by the management service 112. For example, the operating system 143 can allow a client device 106 to be enrolled as a managed device with the management service 112. The operating system 143 can also allow configuration profiles to be installed on the client device 106 by the management service 112. In one scenario, a configuration profile can include an identity certificate generated or obtained by the management service 112. The operating system 143 can also implement security and authentication protocols, such as Kerberos authentication. In one example, the operating system 143 can intercept certain network communications that are related to authentication protocols that are sent to an application or service installed on the client device 106 and can handle responses to these communications on behalf of the application or service.

For example, if a network service, such as the management service 112, issues a hypertext transfer protocol (HTTP) response with status code 401 corresponding to an "Unauthorized" message, or a request for authentication, the operating system 143 can intercept the communication and determine if an appropriate credential or identity certificate has been installed on the client device 106. The request for authentication can include an indication of a necessary, authentication protocol, credential or identity certificate in order to complete authentication. For example, an authentication request can indicate that Kerberos authentication is required by the management service 112 in order to complete authentication of the client device 106. If an appropriate credential or identity certificate is installed on the client device 106, the operating system 143 can reply to the communication on behalf of the application or service to which the communication was sent.

The client device 106 can also execute various applications, such as a management component 145, one or more managed applications 147, and other applications, services, or processes. The management component 145 can monitor or manage at least a portion of the data, applications, or hardware components for the client device 106. The management component 145 can also identify whether the client device 106 is operating in accordance with the compliance rules that have been assigned to the client device 106. In some examples, the management component 145 can function as a portion of an operating system for the client device 106. In other examples, the management component 145 can function in the application layer of the client device 106. Alternatively, the management component 145 can be a portion of an application that was developed, for example, using a Software Development Kit (SDK) that facilitates the inclusion of functionality within the application that monitors or manages at least a portion of the resources for the client device 106.

The management component 145 can be executed by the client device 106 automatically upon startup of the client device 106. Additionally, the management component 145 can run as a background process in the client device 106. Accordingly, the management component 145 can execute without user intervention in some examples. Additionally, the management component 145 can communicate with the management service 112 in order to facilitate management of the client device 106 and enforcement of compliance rules. The management component 145 can also facilitate enrollment of the client device 106 with the management service 112 as a managed device. To facilitate enrollment, the management component 145 can obtain a user's credentials, such as a username/password combination, through a user interface rendered on a display of the client device 106. The management component 145 can then initiate enrollment of the client device 106 with the management service 112. For instance, the management component 145 can install a management profile on the client device 106 that allows the management component 145 and/or management service 112 to manage the client device 106 using management APIs provided by the operating system 143.

A managed application 147 can represent any application installed at the direction of the management service 112. The management service 112 can issue a command directing the client device 106 to install a particular application as a managed application 147 so that the management service 112 can manage the installation of the application. In this way, the management service 112 can initiate erasure of a managed application 147 or data used by the managed application 147, designate settings or policies used by the managed application 147, or perform other management functions associated with the managed application 147 that are supported by the operating system 143.

Device profiles 149 can be stored on the client device 106 and managed by the operating system 143. Device profiles 149 can represent configuration profiles that can allow an administrator to distribute configuration information to a managed device. Device profiles 149 can include, for example, email settings, network settings, identity certificates, or any other configuration data that an administrator may wish to have resident on the client device 106. The management service 112 can transmit device profiles 149 to the client device 106 along with a command to install the device profile 149 on the client device 106 so that they are accessible by certain applications or services that are also installed on the client device 106.

In the context of this disclosure, a device profile 149 installed on the client device 106 at the direction of the management service 112 can include an identity certificate 138 that is generated or obtained by the management service 112 on behalf of a user account that is associated with the client device 106. Accordingly, upon enrollment of the client device 106 with the management service 112, the management service 112 can transmit a device profile 149 that includes the identity certificate 138 for installation on the client device 106. Because the management service 112 can generate or obtain an identity certificate 138 that is associated with a user account, the management service 112 can also verify the identity of a client device 106 by confirming that a certificate provided by the client device 106 matches the identity certificate 138 stored in the user data 133. The device profile 149 containing the identity certificate 138 can be transmitted to the client device 106 over a secure communication link, such as a secure sockets layer (SSL) connection over the network 118.

To facilitate secure distribution of authentication keys 142 to application installations on a client device 106, the management service 112 can authenticate a managed application 147 by leveraging the implementation of a security protocol by the operating system 143, such as Kerberos. In one scenario, a managed application 147, upon launching by a user, can send a communication to the management service 112 over the network. The managed application 147 can be instrumented to provide an authentication key 142, which can be a session token, a one-time password, or any other key, to the management service 112 in order to access a resource that is accessible through the management service 112 or any other system that can rely upon the management service 112 to authenticate the managed application 147.

In one scenario, the managed application 147 can provide an authentication key 142 that has been expired by the management service 112 or is otherwise invalid. If the managed application 147 is being launched for the first time, the managed application 147 will not have an authentication key 142 associated with the installation of the application to provide to the management service 112. In either scenario, the management service 112 can reply to the installation of the managed application 147 with an authentication request, or a communication that indicates that the managed application 147 is not authenticated.

The authentication request can include a HTTP response with status code 401 indicating that the managed application 147 is unauthorized. The operating system 143 can intercept the authentication request and determine whether an appropriate identity certificate 138 is stored on the client device 106 that can be provided to the management service 112. For example, the operating system 143 can identify an appropriate identity certificate 138 based upon a domain name, user identifier, or any other information that is embedded within the authentication request. The management service 112 can validate the identity certificate 138 provided by the operating system 143 and reply with an authentication key 142 to the installation of the managed application 147, which store the authentication key 142 for subsequent communications with the management service 112 or another server or application providing access to a resource. The installation of the managed application 147 can store the authentication key 142 in access-restricted storage that the operating system 143 can prohibit other applications installed on the client device 106 from accessing.

The management service 112 can also revoke an authentication key 142 distributed to the managed application 147 disassociating the authentication key 142 from a user account of a user in the data store 121. In this scenario, the revocation of the authentication key 142 can also revoke access to a particular resource for the installation of the managed application 147 on the client device 106.

Figure 2A:
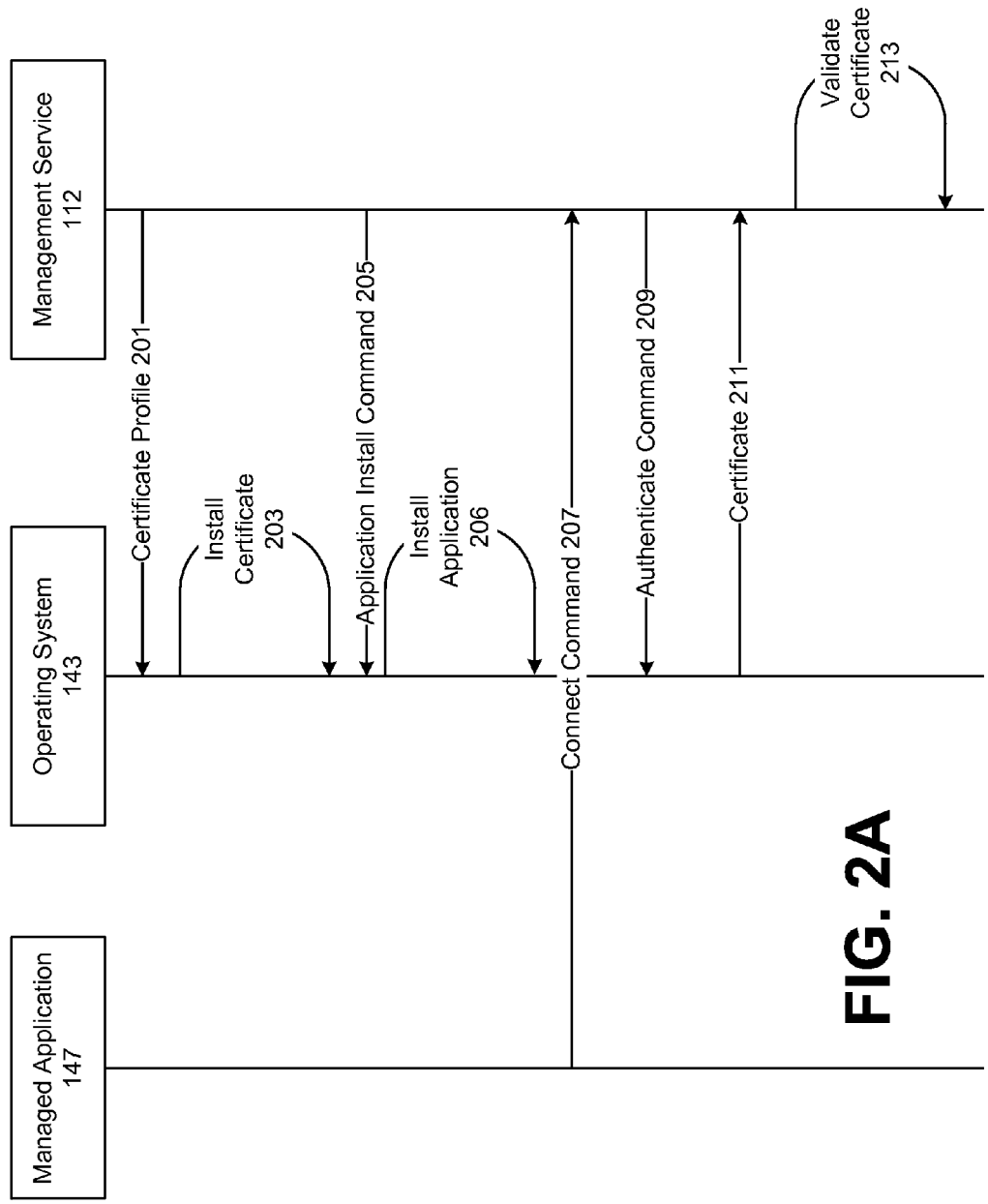

Referring next to FIGS. 2A-2B, shown are sequence diagrams that illustrate interactions between the client device 106 and computing environment 109 according to examples of this disclosure. As shown at step 201, the management service 112 can issue a command to install a device profile 149 on the client device 106 managed by the management service 112. The device profile 149 can include an identity certificate 138 that is generated or obtained by the management service 112 on behalf of a user associated with the client device 106. The identity certificate 138 can facilitate authentication of the client device 106 for subsequent communications with the management service 112.

The certificate profile can be transmitted to the operating system 143 executed by the client device 106, which provides API's facilitating installation of the device profile 149 containing the identity certificate 138. At step 203, the operating system 143 can install the device profile 149 containing the identity certificate 138. The operating system 143 can verify whether the device profile 149 is received from the management service 112 that has the authority to install a device profile 149 on the client device 106. In other words, the operating system 143 can verify that the device profile 149 is received from a system that has the authority to issue MDM commands to the client device 106.

At step 205, the management service 112 can issue a command to install an application as a managed application 147 to the operating system 143. The operating system 143 can initiate installation of the application identified by the command on the client device 106 at step 206. In some examples, the command to install an application as a managed application 147 can also be transmitted to the management component 145 or any other process or agent executed by the client device 106 that has privileges to initiate installation of an application on behalf of the management service 112. At step 206, the operating system 143 can install the application as a managed application 147.

At step 207, the managed application 147 installed by the operating system 143 can transmit a command to connect or access one or more resources to which the management service 112 controls access. The management service 112 can determine whether the command contains an authentication key 142 that corresponds to the installation of the managed application 147. Because, in the depicted scenario, the connect command is the first time the managed application 147 attempts to contact the management service 112, the managed application 147 does not possess an authentication key 142 that authenticates its access to the management service 112.

Accordingly, at step 209, the management service 112 can reply to the connect command with a command to authenticate, or an authentication request. As noted above, an authentication request can include a HTTP response with status code 401 corresponding to an "Unauthorized" message. The authentication request can be sent to or intercepted by the operating system 143, which implements a security protocol such as Kerberos. The operating system 143 can reply to the authentication request on behalf of the managed application 147 with the identity certificate 138 stored on the client device 106 at step 211. At step 213, the management service 112 can validate the identity certificate 138 in order to authenticate the identity of the client device 106 or a user account associated with the client device 106.

Continuing the sequence diagram of FIG. 2A, reference is now made to FIG. 2B. As shown at step 215, upon validation of the identity certificate 138 provided by the operating system 143 in response to the authentication request from the management service 112, the management service 112 can generate or obtain an authentication key 142 and send the authentication key 142 to the managed application 147. The authentication key 142 can include a session key, a session token, an authentication token, a one-time password, or any other credential that can be used by the managed application 147 to authenticate itself to the management service 112 in subsequent communications. For example, in order to access email, documents, or other resources for which the managed application 147 communicates with the management service 112 or other processes in the computing environment 109, the authentication key 142 can be provided as a credential that authenticates the particular installation of the managed application 147 on the client device 106 associated with a particular user account.

At step 217, the managed application 147 can install the authentication key 142. Installing the authentication key 142 can entail saving the authentication key 142 in a secure storage area on the client device 106 that is accessible to the managed application 147. At step 219, the managed application 147 can provide the authentication key 142 to the management service 112. The authentication key 142 can be sent to the management service 112 as a part of a request to access a resource that is accessible through the network 118. The resource can include email, documents, contact data, calendar data, or any other resource to which the management service 112 controls access. At step 221, the management service 112 can verify the authentication key 142 received from the managed application 147 to determine whether the managed application 147 should be granted access to a requested resource.

Figure 3A:
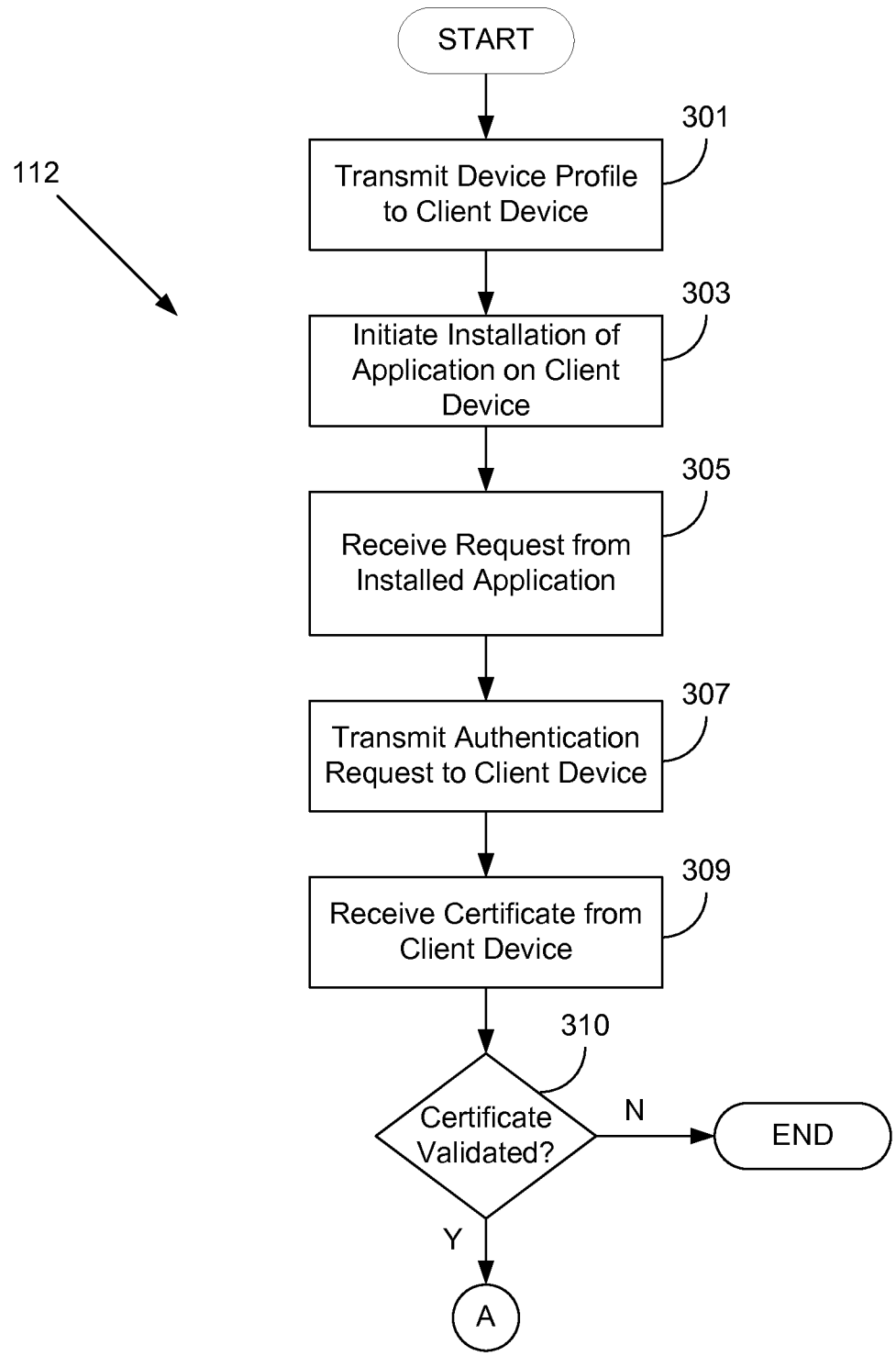
FIGS. 3A-3B depict an example flowchart.
Figure 3B:
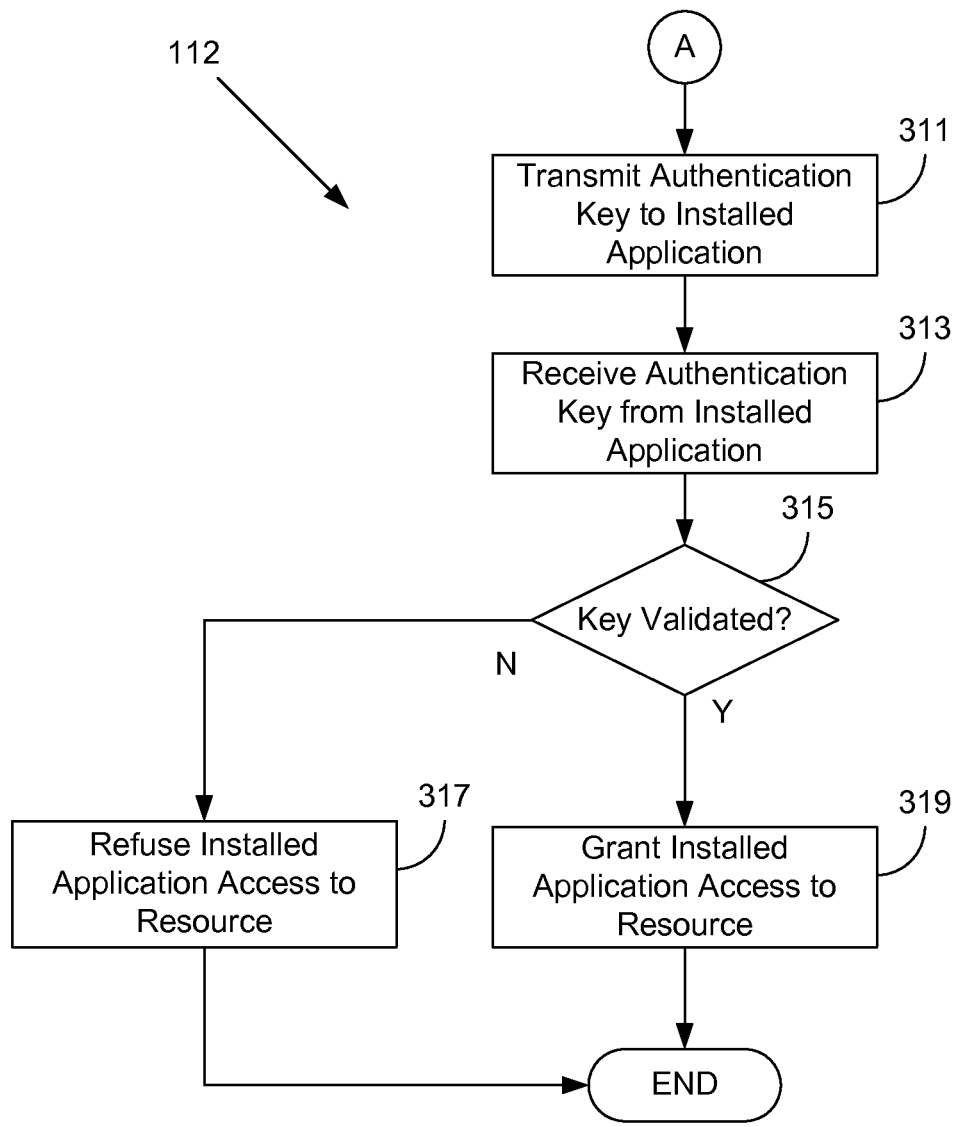

Referring next to FIGS. 3A-3B, shown is a flowchart that provides one example of the operation of the management service 112. As an alternative, the flowchart of FIGS. 3A-3B, shown can be viewed as depicting an example of elements of a method implemented in the computing environment 101. Functionality attributed to the management service 112 can be implemented in a single process or application executed by the computing environment 101 or in multiple processes or applications. The separation or segmentation of functionality as discussed herein is presented for illustrative purposes only.

Beginning with step 301, the management service 112 can transmit a device profile 149 to the client device 106 that includes an identity certificate 138. The device profile 149 can be transmitted in the form of a certificate profile command, configuration profile, or any other command or document that can direct the operating system 143 of the client device 106 to install an identity certificate 138 on the client device 106. The identity certificate 138 can also identify a username of a user account associated with the client device 106, a domain name associated with the management service 112 or the enterprise of the user, or any other identifying information from which the operating system 143 can identify a subsequent authentication request that is sent from the management service 112 to the client device 106.

At step 303, the management service 112 can initiate installation of an application as a managed application 147 on the client device 106. The management service 112 can issue a command directing the operating system 143 or the management component 145 to obtain and install the application as a managed application 147 on the client device 106. At step 305, the management service 112 can receive a request for content from the installation of the managed application 147. In some examples, the request for content can be made to third party services. In this scenario, the management service 112 can facilitate providing an authentication key on behalf of a third party service to the installation of the managed application 147 on the client device 106 in response to the third party service transmitting an authentication request to the installation of the managed application 147. The request can include a connect command according to the Kerberos protocol. The request can also include any other type of connection request for a resource from the managed application 147.

At step 307, the management service 112 can transmit an authentication request to the managed application 147 in response to receiving the request for content from the managed application 147. As noted above, the authentication request can include a HTTP response with status code 401 indicating that the managed application 147 is unauthorized. At step 309, the management service 112 can receive an identity certificate 138 from the client device 106. At step 310, the management service 112 can validate the identity certificate 138 received from the managed application 147. If the identity certificate 138 fails validation, then the process proceeds to completion, as the managed application 147 is not authorized to access the requested resource. The identity certificate 138 can fail validation if the certificate is improperly signed, unsigned, identifies an incorrect user, or contains any other defect that causes the identity certificate 138 to vary from the identity certificate 138 initially provided by the management service 112 to the client device 106 in step 301.

If the identity certificate 138 is validated by the management service 112, the process proceeds to FIG. 3B. At step 311 in FIG. 3B, in response to the identity certificate 138 being validated, the management service 112 transmits an authentication key 142 to the installation of the managed application 147 on the client device 106. At step 313, the management service 112 can receive an authentication key 142 from the managed application 147. At step 315, the management service 112 can determine whether the authentication key 142 corresponds to the authentication key 142 that was provided by the management service 112 to the client device 106. In other words, the management service 112 can validate that the installation of the application requesting content through the management service 112 is the same installation to which the authentication key 142 was provided. If the authentication key 142 is validated, then at step 319, the management service 112 can grant access to the requested resource to the managed application 147. If the authentication key 142 is not validated, then at step 317, the management service 112 can refuse access to the requested resource to the installation of the managed application 147.

The sequence diagram and flowchart of FIGS. 2A-2B and 3A-3B show examples of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function(s).

Although the flowcharts show a specific order of execution, it is understood that the order of execution can differ from that which is shown. For example, the order of execution of two or more elements can be switched relative to the order shown. Also, two or more elements shown in succession can be executed concurrently or with partial concurrence. Further, in some examples, one or more of the elements shown in the flowcharts can be skipped or omitted.

The client device 106, computing environment 109, or other components described herein can include at least one processing circuit. Such a processing circuit can include, for example, one or more processors and one or more storage devices that are coupled to a local interface. The local interface can include, for example, a data bus with an accompanying address/control bus or any other suitable bus structure.

The one or more storage devices for a processing circuit can store data or components that are executable by the one or more processors of the processing circuit. For example, the management service 112, operating system 143, management component 145, or other components can be stored in one or more storage devices and be executable by one or more processors. Also, a data store, such as the data store 121 can be stored in the one or more storage devices.

The management service 112, operating system 143, management component 145, or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All such modifications and variations are intended to be included herein within the scope of this disclosure.

Therefore, the following is claimed:

1. A non-transitory computer-readable medium embodying a program executable in a computing device, the program, when executed by the computing device, being configured to cause the computing device to at least:
   transmit an identity certificate to a client device, the identity certificate uniquely associated with a user account and specifying which applications installed on the client device have permission to access the identity certificate, the identity certificate further being installed as a certificate profile by an operating system executed by the client device;
   initiate an installation of an instance of an application on the client device;
   receive a request to access content from the instance of the application;
   transmit a request for the identity certificate to the client device, wherein the request is intercepted by the operating system executed by the client device;
   receive the identity certificate from the client device;
   validate an identity of the user account based upon whether the identity certificate received from the client device matches the identity certificate transmitted to the client device without first requiring comparison of a username or a password corresponding to a user;
   generate an authentication key in response to validation of the identity of the user account, the authentication key being associated with the instance of the application; and
   transmit the authentication key to the client device to be stored in access-restricted storage such that access by other applications on the client device is prohibited by the operating system, wherein the instance of the application provides the authentication key to authenticate the application for access to a network resource without first requiring comparison of the username or the password corresponding to the user.

2. The non-transitory computer-readable medium of claim 1, wherein the authentication key comprises at least one of a keyed-hash message authentication code (HMAC) or a session token that is associated with the instance of the application.

3. The non-transitory computer-readable medium of claim 1, wherein the authentication key is transmitted to the instance of the application executed by the client device.

4. The non-transitory computer-readable medium of claim 1, wherein the request for the identity certificate comprises a hypertext transfer protocol (HTTP) response with status code 401.

5. The non-transitory computer-readable medium of claim 1, wherein the request for the identity certificate is generated in response to a determination that the instance of the application is not associated with the authentication key, wherein the authentication key is associated with the user account in a data store accessible to the computing device.

6. The non-transitory computer-readable medium of claim 1, the program further being configured to cause the computing device to at least:
receive a request for access to content from the client device; and
authenticate the client device based upon whether the request for access to content from the client device contains the authentication key.

7. The non-transitory computer-readable medium of claim 1, the program further being configured to cause the computing device to at least revoke the authentication key by disassociating the instance of the application from the authentication key in a data store accessible to the computing device.

8. A system, comprising:
at least one computing device comprising one or more processors and memory; and
a management service executable by the at least one computing device, the management service configured to cause the at least one computing device to at least:
transmit an identity certificate to a client device, the identity certificate uniquely associated with a user account and specifying which applications installed on the client device have permission to access the identity certificate, the identity certificate further being installed as a certificate profile by an operating system executed by the client device;
initiate an installation of an instance of an application on the client device;
receive a request to access content from the instance of the application;
transmit a request for the identity certificate to the client device, wherein the request is intercepted by the operating system executed by the client device;
receive the identity certificate from the client device;
validate an identity of the user account based upon whether the identity certificate received from the client device matches the identity certificate transmitted to the client device without first requiring comparison of a username or a password corresponding to a user;
generate an authentication key in response to validation of the identity of the user account, the authentication key being associated with the instance of the application; and
transmit the authentication key to the client device to be stored in access-restricted storage such that access by other applications on the client device is prohibited by the operating system, wherein the instance of the application provides the authentication key to authenticate the application for access to a network resource without first requiring comparison of the username or the password corresponding to the user.

9. The system of claim 8, wherein the authentication key comprises at least one of a keyed-hash message authentication code (HMAC) or a session token that is associated with the instance of the application.

10. The system of claim 8, wherein the authentication key is transmitted to the instance of the application executed by the client device.

11. The system of claim 8, wherein the request for the identity certificate comprises a hypertext transfer protocol (HTTP) response with status code 401.

12. The system of claim 8, wherein the request for the identity certificate is generated in response to a determination that the instance of the application is not associated with the authentication key, wherein the authentication key is associated with the user account in a data store accessible to the at least one computing device.

13. The system of claim 8, wherein the management service is further configured to:
receive a request for access to content from the client device; and
authenticate the client device based upon whether the request for access to content from the client device contains the authentication key.

14. The system of claim 8, wherein the management service is further configured to cause the at least one computing device to at least revoke the authentication key by disassociating the instance of the application from the authentication key in a data store accessible to the at least one computing device.

15. A method, comprising:
transmitting an identity certificate to a client device, the identity certificate uniquely associated with a user account and specifying which applications installed on the client device have permission to access the identity certificate, the identity certificate further being installed as a certificate profile by an operating system executed by the client device;
initiating an installation of an instance of an application on the client device;
receiving a request to access content from the instance of the application;
transmitting a request for the identity certificate to the client device, wherein the request is intercepted by the operating system executed by the client device;
receiving the identity certificate from the client device;
validating an identity of the user account based upon whether the identity certificate received from the client device matches the identity certificate transmitted to the client device without first requiring comparison of a username or a password corresponding to a user;
generating an authentication key in response to validation of the identity of the user account, the authentication key being associated with the instance of the application; and
transmitting the authentication key to the client device to be stored in access-restricted storage such that access by other applications on the client device is prohibited by the operating system, wherein the instance of the application provides the authentication key to authenticate the application for access to a network resource without first requiring comparison of the username or the password corresponding to the user.

16. The method of claim 15, wherein the authentication key comprises at least one of a keyed-hash message authentication (HMAC) code or a session token that is associated with the instance of the application.

17. The method of claim 15, wherein the authentication key is transmitted to the instance of the application executed by the client device.

18. The method of claim 15, wherein the request for the identity certificate is generated in response to a determination that the instance of the application is not associated with the authentication key, wherein the authentication key is associated with the user account.

19. The method of claim 15, further comprising:
- receiving a request for access to content from the client device; and
- authenticating the client device based upon whether the request for access to content from the client device contains the authentication key.

20. The method of claim 15, further comprising revoking the authentication key by disassociating the instance of the application from the authentication key in a data store.

* * * * *